United States Patent
Tsukamoto

(10) Patent No.: US 12,530,973 B2
(45) Date of Patent: Jan. 20, 2026

(54) INFORMATION PROCESSING APPARATUS

(71) Applicant: TOYOTA JIDOSHA KABUSHIKI KAISHA, Toyota (JP)

(72) Inventor: Jun Tsukamoto, Seto (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 80 days.

(21) Appl. No.: 18/435,106

(22) Filed: Feb. 7, 2024

(65) Prior Publication Data

US 2024/0274013 A1    Aug. 15, 2024

(30) Foreign Application Priority Data

Feb. 9, 2023    (JP) ................................ 2023-018660

(51) Int. Cl.
```
G08G 1/00      (2006.01)
G08G 1/01      (2006.01)
G08G 1/052     (2006.01)
```

(52) U.S. Cl.
CPC ........... *G08G 1/205* (2013.01); *G08G 1/0145* (2013.01); *G08G 1/052* (2013.01)

(58) Field of Classification Search
None
See application file for complete search history.

(56) References Cited

U.S. PATENT DOCUMENTS

| | | | |
|---|---|---|---|
| 2010/0256852 A1* | 10/2010 | Mudalige | G08G 1/22 701/24 |
| 2013/0144516 A1 | 6/2013 | Sato | |
| 2018/0211546 A1* | 7/2018 | Smartt | H04W 4/023 |
| 2019/0180617 A1* | 6/2019 | Hori | B60W 50/0097 |
| 2020/0057453 A1* | 2/2020 | Laws | B60W 10/04 |
| 2020/0125086 A1* | 4/2020 | Switkes | B60T 7/22 |
| 2020/0125117 A1* | 4/2020 | Switkes | H04W 4/029 |
| 2020/0209889 A1* | 7/2020 | Dev | B60R 1/27 |
| 2022/0379924 A1* | 12/2022 | Foster | B60W 30/18163 |

FOREIGN PATENT DOCUMENTS

| | | |
|---|---|---|
| JP | 2012-043094 A | 3/2012 |
| JP | 2016-181226 A | 10/2016 |

* cited by examiner

*Primary Examiner* — Truc M Do
(74) *Attorney, Agent, or Firm* — Dinsmore & Shohl LLP

(57) ABSTRACT

An information processing apparatus determines whether speed of a first vehicle traveling at a head of a convoy of more than a predetermined number of vehicles or more than a predetermined length is less than a predetermined speed. The information processing apparatus outputs notification information to induce a user of the first vehicle to stop traveling at the head of the convoy when the speed of the first vehicle is less than the predetermined speed.

7 Claims, 7 Drawing Sheets

ROAD INFORMATION

| SEGMENT ID | LOCATION | LANE | CONGESTION |
|---|---|---|---|
| *** | *** | *** | *** |
| ⋮ | ⋮ | ⋮ | ⋮ |

Fig. 4

FACILITY INFORMATION

| FACILITY ID | LOCATION | ATTRIBUTE |
|---|---|---|
| *** | *** | *** |
| ⋮ | ⋮ | ⋮ |

Fig. 5

INFORMATION PROCESSING APPARATUS

CROSS REFERENCE TO THE RELATED APPLICATION

This application claims the benefit of Japanese Patent Application No. 2023-018660, filed on Feb. 9, 2023, which is hereby incorporated by reference herein in its entirety.

BACKGROUND

Technical Field

This disclosure relates to information processing apparatus.

Description of the Related Art

Japanese Patent Application Laid-Open No. 2016-181226 discloses a driving support device mounted on a vehicle to provide driving assistance to the driver. The driving support device disclosed by Japanese Patent Application Laid-Open No. 2016-181226 detects other following vehicles traveling behind the own vehicle. The driver assistance system detects the speed of the own vehicle. The driver assistance system determines the approach of the following vehicle to the own vehicle based on the distance between the following vehicle and the own vehicle and the speed of the own vehicle. The driver assistance system then notifies the driver when it determines that a following vehicle is approaching the own vehicle.

SUMMARY

The purpose of present disclosure is to control traffic congestion.

An information processing apparatus, according to the present disclosure, comprises a controller comprising at least one processor configured to; determine whether speed of a first vehicle traveling at a head of a convoy of more than a predetermined number of vehicles or more than a predetermined length is less than a predetermined speed, and output notification information to induce a user of the first vehicle to stop traveling at the head of the convoy, when the speed of the first vehicle is less than the predetermined speed.

This disclosure can reduce traffic congestion.

BRIEF DESCRIPTION OF THE DRAWINGS

FIG. 4 indicates an example of the table structure of road information maintained in the road information database.

FIG. 5 indicates an example of the table structure of facility information maintained in the facility information database.

DESCRIPTION OF THE EMBODIMENTS

Assume that the first vehicle is traveling at the head of the convoy at a speed that interferes with the following vehicles. If so, the following vehicle traveling behind the first vehicle may not be able to overtake the first vehicle, causing the first vehicle to cause traffic congestion. The information processing apparatus of the present disclosure solves such problems.

The controller comprising at least one processor of the information processing apparatus of the present disclosure determines whether the speed of the first vehicle traveling at the head of a convoy of more than a predetermined number or more than a predetermined length is less than a predetermined speed. The controller of the information processing apparatus outputs the notification information when the speed of the first vehicle is below the predetermined speed. Here, the notification information is information to provide notification to induce the user of the first vehicle to stop traveling at the head of the convoy.

As explained above, the notification information is output by the information processor when the first vehicle is traveling at or below a predetermined speed at the head of a convoy with a number or length of vehicles above a predetermined value. This induces the user of the first vehicle to stop traveling at the head of the convoy. As a result, traffic congestion can be controlled.

Specific embodiments of the present disclosure will be described below on the basis of the drawings. The technical scope of the present disclosure is not limited to sizes, materials, shapes, relative arrangement, and the like of constituent components described in the present embodiments unless otherwise described.

Embodiment 1

(System Overview)

Figure 1:
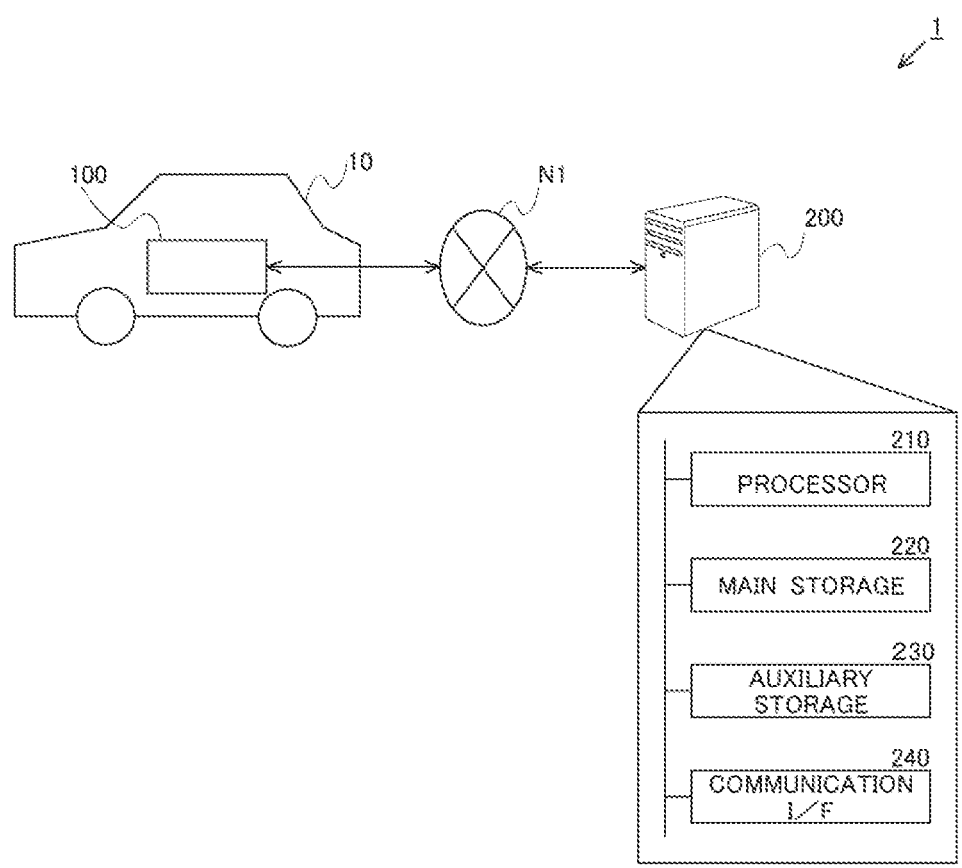
FIG. 1 indicates the schematic structure of the notification system.
Figure 2:
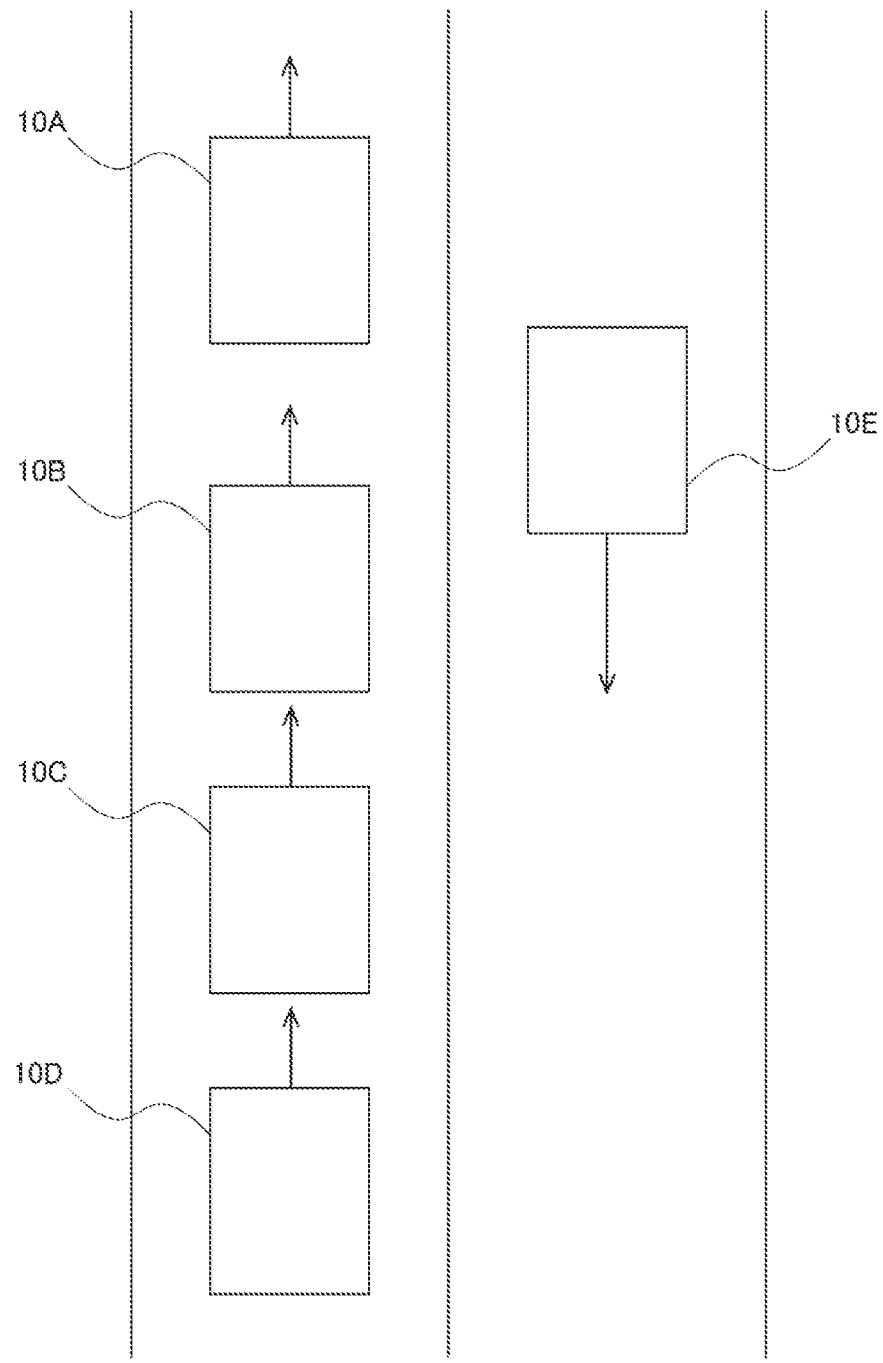
FIG. 2 indicates an example of a situation when a vehicle is traveling on a road.

The notification system 1 in this embodiment is described based on FIG. 1 and FIG. 2. FIG. 1 indicates a schematic diagram of the notification system 1. The notification system 1 comprises an in-vehicle device 100 and a management server 200. In the notification system 1, the in-vehicle device 100 and the management server 200 are interconnected by the network N1. For example, a network (WAN), which is a worldwide public communication network such as the Internet, or a telephone communication network such as a cellular phone may be employed for the network N1.

(In-Vehicle Device)

The in-vehicle device 100 is a device installed in the vehicle 10. The in-vehicle device 100 provides a variety of information to the user (driver) of the vehicle 10. FIG. 2 indicates an example of a situation when a vehicle 10 is traveling on a road. FIG. 2 shows a situation where several vehicles 10 are traveling on a one-lane road. In the example indicated in FIG. 2, a convoy is formed by several vehicles 10 (vehicle 10A, vehicle 10B, vehicle 10C, and vehicle 10D). In the lane next to where vehicle 10A is traveling, vehicle 10E is traveling in the opposite direction to vehicle 10A.

Also, in the FIG. 2 to indicate example, vehicle 10A, traveling at the front of the convoy, is traveling at a speed that interferes with the following vehicles 10 (vehicle 10B, vehicle 10C, and vehicle 10D). Then, when the lane in which multiple vehicles 10 are traveling is a no-passing lane, vehicle 10B, vehicle 10C, and vehicle 10D cannot overtake or pass vehicle 10A, and vehicle 10A may cause traffic congestion This may cause traffic congestion.

Therefore, the in-vehicle device 100 in vehicle 10A notifies the user of vehicle 10A to induce the user to stop traveling at the head of the convoy. Here, stopping traveling at the head of the convoy includes visiting a different location than the destination on the way to the destination. Stopping traveling at the head of the convoy includes increasing the speed and leaving the convoy. Stopping traveling at the head of the convoy also includes giving way to the following vehicles (vehicle 10B, vehicle 10C, and vehicle 10D). The details of how the in-vehicle device 100 in vehicle 10A notifies the user of vehicle 10A to induce the user to stop traveling at the head of the convoy are described below.

(Management Server)

The management server 200 is a server that manages the running of the vehicle 10. The management server 200 receives information (sometimes referred to as "position information") of current position of vehicle 10 from in-vehicle device 100 via network N1. Here, the management server 200 periodically receives position information about the current position of each vehicle 10 from the in-vehicle device 100 installed in each vehicle 10. Based on the position information received from each of the in-vehicle devices 100, the management server 200 can determine whether or not a convoy of vehicles is forming on the road.

The management server 200 determines whether the vehicle 10 is traveling at the head of a convoy consisting of a predetermined number of vehicles or more and whether the vehicle 10 is traveling at or below a predetermined speed. Here, the predetermined number of vehicles is the number of vehicles 10 can be judged to be impeding smooth traffic flow. The predetermined units may be different for different roads (road segments). The predetermined speed is the speed at which the vehicle 10 is traveling at the head of the convoy and can be judged to be obstructing the traveling of the following vehicles 10. The predetermined speed may be set at different speeds for different roads (road segments).

Then, management server 200 outputs a notification information to in-vehicle device 100 on vehicle 10 when the speed of vehicle 10, which is traveling at the head of predetermined the convoy with more than the number of vehicles, is less than predetermined speed. Here, the notification information is information for notifying the user of the vehicle 10 to induce the user to stop traveling at the head of the convoy. The method by which the management server 200 outputs notification information to the in-vehicle device 100 and the details of the contents are described below.

In this embodiment, management server 200 determines whether vehicle 10 is traveling at the head of a convoy of more than predetermined number of vehicles. However, the management server 200 does not necessarily need to determine whether the vehicle 10 is traveling at the head of a convoy consisting of the predetermined number of vehicles or more. The management server 200 may, for example, determine whether the vehicle 10 is traveling at the head of a convoy predetermined a predetermined length or longer. The management server 200 then outputs the notification information to the in-vehicle device 100 mounted on the vehicle 10 when the speed of the vehicle 10 traveling at the head of a convoy predetermined length or longer is less than the predetermined speed.

The management server 200 comprises a computer having a processor 210, main memory 220, auxiliary storage 230, and communication interface (communication I/F) 240. The processor 210 is, for example, a CPU (Central Processing Unit) or DSP (Digital Signal Processor). The main storage 220 is, for example, RAM (Random Access Memory). The auxiliary storage 230 is, for example, ROM (Read Only Memory). The auxiliary storage 230 is, for example, a hard disk drive (HDD) or a disk storage medium such as a CD-ROM, DVD disk, or Blu-ray disk. The auxiliary storage 230 may be removable media (portable storage media). Here, USB memory sticks or SD cards are examples of removable media. The communication I/F 240 is, for example, a LAN (Local Area Network) interface board or a wireless communication circuit for wireless communication.

In the management server 200, auxiliary storage 230 stores an operating system (OS), various programs, and various information tables. In the management server 200, processor 210 loads and executes the program stored in auxiliary storage 230 into main storage 220 to realize various functions as described below. However, some or all of the functions in the management server 200 may be realized by hardware circuits such as ASICs or FPGAs. The management server 200 does not necessarily have to be realized by a single physical configuration, but may be composed of multiple computers that are linked to each other. The in-vehicle device 100 also comprises a computer, as does the management server 200.

(Functional Configuration)

Figure 3:
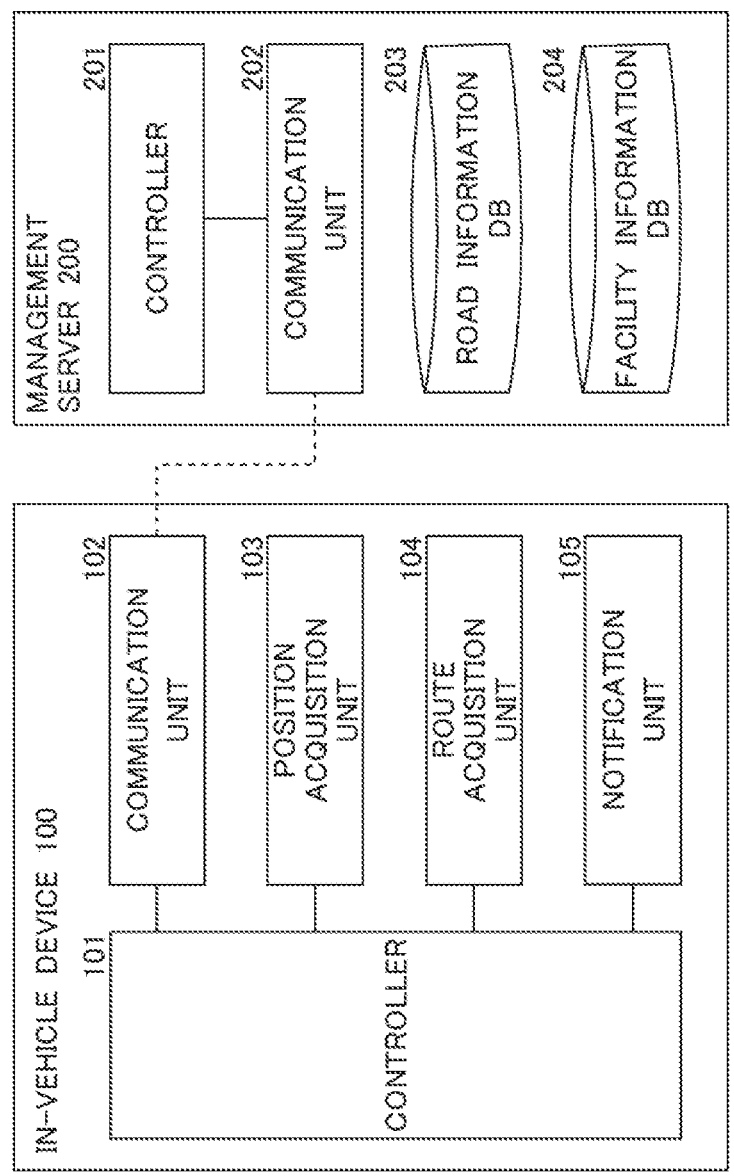
FIG. 3 is a block diagram indicating an example of the functional configuration of an in-vehicle device and management server.

Next, the functional configuration of the in-vehicle device 100 and the management server 200, which comprise the notification system 1, will be explained based on FIG. 3 through FIG. 5 FIG. 3 is a block diagram indicating an example of the functional configuration of the in-vehicle device 100 and the management server 200.

(In-Vehicle Device)

The in-vehicle device 100 comprises a controller 101, a communication unit 102, a position acquisition unit 103, a route acquisition unit 104, and a notification unit 105. The controller 101 has the function of performing arithmetic operations to control the in-vehicle device 100. The controller 101 can be realized by a processor in the in-vehicle device 100. The communication unit 102 has the function of connecting the in-vehicle device 100 to the network N1. The communication unit 102 can be realized by a communication I/F in the in-vehicle device 100.

The position acquisition unit 103 has the function of acquiring the current position of the vehicle 10. The position acquisition unit 103 obtains, for example, the current position of the vehicle 10 from the GPS sensor of the vehicle 10. The controller 101 obtains the current position of the vehicle 10 via the position acquisition unit 103 and generates position information. The controller 101 periodically transmits position information to the management server 200 via the communication unit 102. The position information transmitted to the management server 200 includes an identifier (vehicle ID) to identify the vehicle 10.

The route acquisition unit 104 has the function of acquiring the route that the vehicle 10 is scheduled traveled to travel. The route acquisition unit 104 obtains, for example, the scheduled travel route of the vehicle 10 from the vehicle navigation system of the vehicle 10. The controller 101 transmits route information including the scheduled traveled route of the vehicle 10 to the management server 200 via the communication unit 102. In this embodiment, the controller 101 sends route information to the management server 200 when requested by the management server 200 to send route information.

The notification unit 105 has the function of notifying the user of the vehicle 10 of various information. The notification unit 105 can be realized, for example, by a speaker in the vehicle 10. When the controller 101 receives the notification information, it notifies the user based on the notification information by having the notification unit 105 output audio. The notification unit 105 may be realized by a display in the vehicle 10. In this case, when the controller 101 receives the notification information via the communication unit 102, it performs notification based on the notification information by displaying the notification information in the notification unit 105.

(Management Server)

The management server 200 consists of a controller 201, communication unit 202, road information database 203 (road information DB 203), and facility information database 204 (facility information DB 204). The controller 201 has the function of performing arithmetic operations to control the management server 200. The controller 201 can be realized by the processor 210 in the management server 200. The communication unit 202 has the function of connecting the management server 200 to the network N1. The communication unit 202 can be realized by the communication I/F 240 in the in-vehicle device 100.

The road information DB 203 has the function of holding road information. The road information includes information on the layout of road segments in a predetermined region and the lanes that the road segments have. In addition, road information includes information on traffic congestion on each road segment. The road information DB 203 can be realized by the auxiliary storage 230 in the management server 200. FIG. 4 is an example of the table structure of the road information held in the road information DB 203 is shown in the indicate figure.

As FIG. 4 indicates, the road information is information that includes a segment ID field, a location field, a lane field, and a congestion field. The section ID field contains an identifier (section ID) to identify a road section in a predetermined region. The section ID field contains, for example, the link number associated with a road section (link). The location field contains the location information of the nodes at both ends of the road segment corresponding to the segment ID stored in the segment ID field. The location information stored in the location field is, for example, latitude and longitude information for nodes at both ends of a road segment.

The lane field contains information indicating the lane that the road segment has. The information indicating the lanes that a road segment has, stored in the lane field, is, for example, the number of lanes that the road segment has (number of travel lanes and passing lanes), or whether the road segment has climbing lanes. The congestion field contains information indicating the status of congestion on the road segment corresponding to the segment ID stored in the segment ID field.

The facility information DB 204 has the function of holding facility information. The facility information is information that indicates the location and attributes of a facility in a predetermined region. The facility information DB 204 can be realized by the auxiliary storage 230 at management server 200. FIG. 5 is an example of the table structure of a facility information held in the facility information DB 204 is shown in Figure indicate.

As FIG. 5 indicates, the facility information has a facility ID field, a location field, and an attribute field. The facility ID field contains an identifier (facility ID) to identify a facility in a predetermined region. The location field is populated with the location information of the facility corresponding to the facility ID stored in the facility ID field. The location information stored in the location field is, for example, information indicating the latitude and longitude of the point where the facility is located.

The controller 201 receives the position information of the vehicle 10 from the in-vehicle device 100 via the communication unit 202. The controller 201 also acquires road information held in the road information DB 203 from the road information DB 203. The controller 201 identifies the road segment on which vehicle 10 is currently traveling based on position information received from vehicle 10 and the road information obtained from the road information DB 203.

The controller 201 also periodically receives position information from a plurality of vehicles 10 via the communication unit 202. The controller 201 determines if multiple vehicle 10 form a convoy based on the position information of multiple vehicle 10 and the information of roads information maintained in DB 203. Specifically, the controller 201 identifies the road segment on which the plurality of vehicles 10 are currently traveling based on the position information of the plurality of vehicles 10. The controller 201 determines that a convoy is formed by a plurality of vehicles 10 traveling in the same lane on a single road segment or on a connected plurality of road segments, when there are a plurality of vehicles 10 traveling in the same lane with a distance between them less than a predetermined distance. Here, the controller 201 identifies the lane in which each vehicle 10 is traveling based on the position information of each vehicle 10. Then, the controller 201 determines whether a predetermined number or more of vehicles 10 form a convoy.

Instead of determining whether the convoy consists of more than a predetermined number of vehicles, the controller 201 may determine whether the convoy is more than a predetermined length. In this case, the controller 201 obtains the length of the convoy formed by a plurality of vehicles 10 traveling in the same lane on a single road segment or a connected plurality of road segments, where the distance between vehicles is less than a predetermined distance. The length of the convoy is calculated, for example, based on the distance between multiple vehicles 10 traveling in the same lane on a single road segment or multiple connected road segments.

The controller 201 also identifies the vehicle 10 running at the head of the convoy (hereinafter referred to as the "head vehicle 10") out of the multiple vehicle 10 comprising the convoy based on the vehicle ID of each vehicle 10 contained in position information. The controller 201 determines whether the speed of the head vehicle 10 is below a predetermined speed based on the transition of the position information of the head vehicle 10. The controller 201 may receive the travel speed of the head vehicle 10 together with position information from the in-vehicle device 100. If the head vehicle 10 speed is determined to be less than or equal to the predetermined speed, the controller 201 acquires the facility information held in the facility information DB 204.

Based on the acquired facility information and the current position of the head vehicle 10, the controller 201 identifies one or more facilities that exist within a predetermined range from the current position of the head vehicle 10. The controller 201 also identifies one or more facilities from the identified one or more facilities where the vehicle 10 can be stopped. Specifically, controller 201 identifies facilities located within the predetermined range from the head vehicle 10 based on the location information of the facility stored in the location field of the facility information. The controller 201 also identifies facilities where the head vehicle 10 can be stopped based on the attribute field of the facility information. Here, a facility where the head vehicle 10 can be parked (hereinafter referred to as "specific facility") is, for example, a rest facility for drivers, or a store such as a convenience store, etc., with a parking lot. If there is more than one facility that the head vehicle 10 can stop at, for example, the closest facility from current position is identified as the specific facility.

When the controller 201 identifies the specified facility, it generates notification information and outputs the notification information to the in-vehicle device 100 installed in the head vehicle 10 via the communication unit 202. The notification information generated at this time is information proposing to visit a specific facility for the head vehicle 10 user. The notification information may be information proposing to visit a specific facility and take a break for the user of the head vehicle 10.

This causes notification of notification information to be made to user of the head vehicle 10 by the notification unit 105 in in-vehicle device 100 on the head vehicle 10. Here, the notification unit 105 in the in-vehicle device 100 installed in the head vehicle 10 notifies the user of the head vehicle 10 proposing to visit a specific facility. Consequently, the user of the head vehicle 10 is urged to change a route for visiting the specific facility. As a result, the user of the head vehicle 10 can be encouraged to move the head vehicle 10 away from the convoy.

When generating the notification information, the controller 201 transmits the first request information to the in-vehicle device 100 of the head vehicle 10 to request that the route information be transmitted. The controller 201 checks if there is traffic congestion on the scheduled travel route of the head vehicle 10 based on the route information received from the head vehicle 10 in-vehicle device 100 and the road information maintained in the road information DB 203. If there is traffic congestion on the route that the head vehicle 10 is scheduled travel, the controller 201 generates notification information that suggests, for example, that the user take a short break at a specific facility because it is anticipated that the user will be caught in traffic congestion. The generated notification information may also be information, which proposes to visit a specific facility and change the route to destination. Thus, the controller 201 determines the content of the notification information depending on whether or not there is traffic congestion on the scheduled travel route at the head vehicle 10. By providing the user of the head vehicle 10 with a reason to visit a particular facility, it is easier to induce them to stop driving at the head of the convoy.

(First Flowchart)

Figure 6:
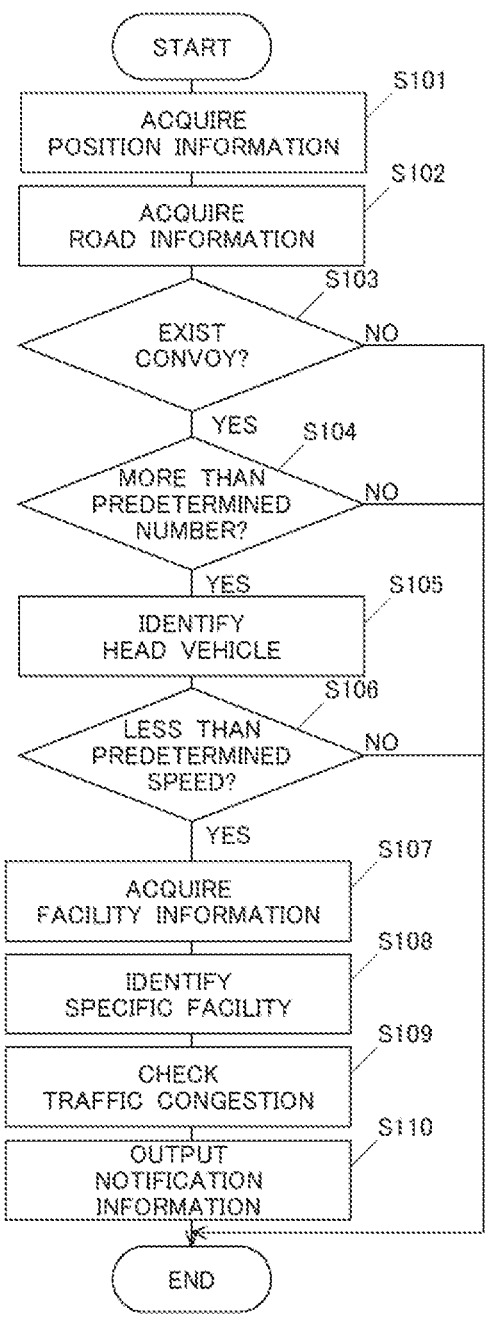
FIG. 6 is a flowchart of the first process executed by the controller in the management server.

Next, the first process performed by the controller 201 at management server 200 in the notification system 1 in this embodiment is described based on FIG. 6. FIG. 6 is a flowchart of the first process performed by controller 201 at management server 200. The first process indicated in FIG. 6 is repeated in a predetermined cycle.

In the first process, position information received from multiple vehicle 10 is first obtained in S101. Next, in S102, road information is retrieved from the road information DB 203. Next, in S103, based on the position information of the multiple vehicles and the road information, it is determined whether or not a convoy of vehicles exists in the predetermined region. If a negative decision is made in S103, there is no convoy within the predetermined region. Therefore, the first process is terminated once.

If a positive decision is made in S103, in S104, it is determined whether the convoy consists of more than predetermined number of vehicles. If a negative decision is made in S104, the first process is temporarily terminated because there are no more than the predetermined number of vehicles in the predetermined region.

If a positive decision is made in S104, in S105, the head vehicle 10 of the multiple vehicle 10 that comprise the convoy is identified based on position information of the multiple vehicle 10. Next, in S106, it is determined whether the speed of the head vehicle 10 is less than or equal to the predetermined speed. If a negative decision is made in S106, it can be inferred that even if the head vehicle 10 is traveling at the head of the convoy, it is not traveling at a speed that would interfere with the traveling of the following vehicles 10. Therefore, the first process is terminated once.

If a positive decision is made in S106, it can be inferred that the head vehicle 10 is obstructing the traveling of the following vehicles 10. Therefore, if a positive decision is made in S106, the first process is not terminated and the process in S107 is executed. In S107, facility information is obtained from the facility information DB 204. Next, in S108, specific facilities are identified based on the position information of the head vehicle 10 and facility information.

Next, in S109, the route information is received from the in-vehicle device 100 of the head vehicle 10 by sending the first request information to the in-vehicle device 100 of the head vehicle 10. Then, in S109, based on the route information and the road information held in the road information DB 203, it is checked whether there is a traffic jam on the scheduled travel route at the head vehicle 10. Next, in S110, a notification information is output to in-vehicle device 100 of the head vehicle 10 to suggest a visit to a specific facility to user of the head vehicle 10. At this time, different notification information is output to the in-vehicle device 100 of the head vehicle 10 depending on whether or not there is a traffic jam on the route the head vehicle 10 is scheduled to travel. The first process is then terminated.

As explained above, when the head vehicle 10 is running at the head of convoy of more than the predetermined number of vehicles at the predetermined speed or less, the notification system 1 outputs the notification information to the in-vehicle device 100 of the head vehicle 10. Consequently, the notification for proposing to visit the specific facility is given to the user of the head vehicle 10, and the user of the head vehicle 10 is urged to visit the specific facility. Therefore, the user of the head vehicle 10 can be urged to leave the head vehicle 10 from the convoy, and the head vehicle 10 is urged not to travel at the head of the convoy. As a result, traffic congestion can be reduced.

(Variant 1)

In this embodiment, management server 200 determines whether or not a convoy exists and whether or not the convoy is more than predetermined number of vehicles based on multiple vehicle 10 position information and roads information. On the other hand, in this variant, the in-vehicle device 100 determines whether or not a convoy of vehicles exists and whether or not the number of vehicles in the convoy is greater than or equal to the predetermined number.

In this variant, the controller 101 determines whether or not another vehicle 10 exists in front of the vehicle 10 based on a moving image captured by a camera installed in front of the vehicle 10 (hereinafter referred to as a "front camera"). The controller 101 also determines whether or not there are other vehicles 10 behind the vehicle 10 based on moving images captured by a camera installed behind the vehicle 10 (hereinafter referred to as the "rear camera"). The controller 101 can know that the vehicle 10 is traveling at the head of the convoy when no other vehicle 10 is captured in the video image captured by the front camera and the other vehicle 10 is captured in the video image captured by the rear camera.

The controller 101 also identifies the number of other vehicles 10 traveling behind the vehicle 10 or the length of the convoy by other vehicles 10 based on the video images captured by the rear camera. Here, the rear camera may not be able to image the convoy of vehicles traveling behind the vehicle 10. In such a case, for example, when vehicle 10 is traveling on a curve, the rear camera can capture images of the convoy formed behind vehicle 10. For example, if vehicle 10 is traveling up a hill, the rear camera can capture images of the convoy formed behind vehicle 10.

The in-vehicle device 100 may also know that the vehicle 10 is traveling at the head of a convoy consisting of more than a predetermined number of vehicles by a method other than video images captured by the forward and rearward cameras. The in-vehicle device 100 may, for example, use a communication device capable of inter-vehicle communication with surrounding vehicles to determine the number of other vehicles 10 traveling behind the vehicle 10. The in-vehicle device 100 may also know that the vehicle 10 is traveling at the front of the convoy when inter-vehicle communication with other vehicles traveling in front of the vehicle 10 is not possible.

The controller 101 obtains the travel speed of vehicle 10 from the electronic unit that controls the travel of vehicle 10 when vehicle 10 is traveling at the head of the convoy. The controller 101 outputs the notification information to the notification unit 105 when it determines that the traveling speed of the vehicle 10 obtained from the electronic unit is the predetermined speed.

In the case where the in-vehicle device 100 is configured to include a facility information database, the controller 101 identifies specific facilities and outputs notification information suggesting that the user visit the specific facilities. If the in-vehicle device 100 is not configured to include a facility information database, the controller 101 transmits the specific information to the management server 200 via the communication unit 102. Here, the specific information is information indicating that the vehicle 10 is traveling at less than the predetermined speed at the head of convoy consisting of the predetermined number of vehicles or more. This allows management server 200 to identify in-vehicle device 100, which sent the specific information, as the output target of the notification information. Therefore, the management server 200 outputs notification information to the in-vehicle device 100 that transmitted the specific information based on the facility information and road information. In this way, traffic congestion can still be controlled.

Embodiment 2

In the first embodiment, the management server 200 outputs notification information to the in-vehicle device 100 of the head vehicle 10 that suggests visiting a specific facility based on the current position of the head vehicle 10 and facility information. However, the notification information sent by the management server 200 does not necessarily have to be information that suggests visiting a specific facility. In this embodiment, management server 200 outputs a notification information proposing to the head vehicle 10 user to change the lane in which the head vehicle 10 is traveling if it is determined that it is possible to have the head vehicle 10 change the lane in which the head vehicle 10 is traveling based on the road information. Points that differ from the embodiment are explained below.

Assume that the head vehicle 10 is traveling at less than a predetermined speed at the head of a convoy consisting of more than a predetermined number of vehicles. In this case, controller 201 determines whether the road segment on which the head vehicle 10 is traveling has multiple lanes based on the road information maintained in the road information DB 203. Specifically, the controller 201 determines whether the lane in which the head vehicle 10 is traveling has multiple lanes based on the information indicating the lanes that the road segment has stored in the lane field in the road information. When the controller 201 determines that the lane in which the head vehicle 10 is traveling has multiple lanes, it generates notification information and outputs the notification information to the in-vehicle device 100 of the head vehicle 10.

Here, the notification information generated by the controller 201 is information to urge the user of the head vehicle 10 to change the lane in which the head vehicle 10 is traveling. If the road section on which the head vehicle 10 is traveling has two lanes, an overtaking lane and a driving lane, the controller 201 generates notification information suggesting that the user of the head vehicle 10 move to the overtaking lane or the driving lane. If the road segment on which the head vehicle 10 is traveling has a climbing lane, the controller 201 generates notification information suggesting that the user of the head vehicle 10 move to the climbing lane. The in-vehicle device 100 of the head vehicle 10 will, based on the notification information received from the management server 200, notify the user of the head vehicle 10 to change the lane in which the head vehicle 10 is traveling.

(Second Flowchart)

Figure 7:
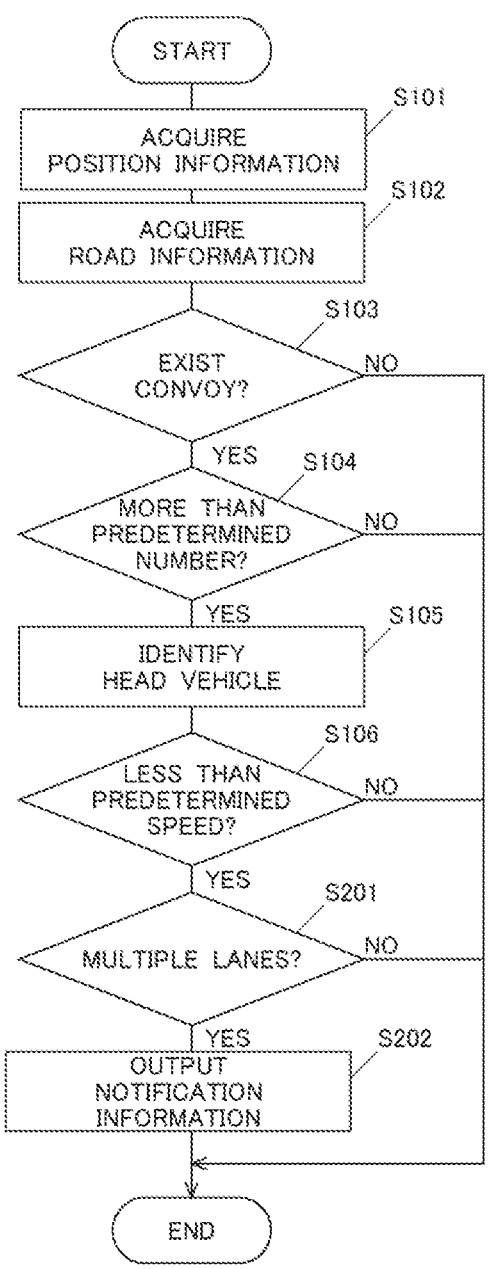
FIG. 7 is a flowchart of the second process executed by the controller in the management server.

Next, the second process executed by the controller 201 in the management server 200 in the notification system 1 in this embodiment is described based on FIG. 7. FIG. 7 is a flowchart of the second process executed by the controller 201 in the management server 200. The second process indicated in FIG. 7 is repeated in a predetermined cycle. The processes indicated in S101 to S106 in the second process shown by FIG. 7 are the same as those shown in S101 to S106 in the first process shown in FIG. 6, so the explanation is omitted.

In the second process, if a positive decision is made in S106, the process in S201 is executed. In S201, based on the road information maintained in the road information DB 203, it is determined whether or not the lane in which the head vehicle 10 is traveling has multiple lanes. If a negative decision is made in S201, the head vehicle 10 cannot change lanes. Therefore, the second process is terminated once.

If a positive decision is made in S201, the head vehicle 10 can change lanes. Therefore, in S202, notification information is output to the in-vehicle device 100 of the head vehicle 10 to urge the user of the head vehicle 10 to change the lane in which the head vehicle 10 is traveling. The second process is then terminated.

The notification system 1 in this system outputs notification information when the head vehicle 10 is traveling at or below the predetermined speed at the head of convoy of more than the predetermined number of vehicles and the lane in which the head vehicle 10 is traveling has multiple lanes. This may stop the user of the head vehicle 10 from traveling at the head of a convoy formed by several vehicles 10 by changing the lane in which the head vehicle 10 is traveling. As a result, traffic congestion can be reduced.

(Variant 2)

In the second embodiment, the notification information is output in a situation where the head vehicle 10 is traveling at less than the predetermined speed at the head of a convoy consisting of the predetermined number of vehicles or more, and the lane in which the head vehicle 10 is traveling has multiple lanes. On the other hand, in this variant, the notification information is output when the fuel or running battery of the head vehicle 10 is less than or equal to the predetermined remaining amount of fuel or running battery of the head vehicle 10 in a situation where the head vehicle 10 is traveling at predetermined speed or less at the head of a convoy consisting of predetermined more than the number of vehicles. The notification information output in this variant is information that suggests the user of the head vehicle 10 to refuel the head vehicle 10 or charge the running battery. Points that differ from the second embodiment are explained below.

Assume that the head vehicle 10 is traveling at less than a predetermined speed at the head of a convoy consisting of more than a predetermined number of vehicles. In this case, the controller 201 transmits the second request information to the in-vehicle device 100 of the head vehicle 10 via the communication unit 202. The second request information is information that requests the management server 200 to transmit the remaining amount information regarding the remaining amount of fuel or battery of the head vehicle 10. The controller 201 receives the remaining amount information from in-vehicle device 100 by sending a second request information. This allows the controller 201 to know how much fuel or battery power remains in the vehicle 10.

The controller 201 determines whether the fuel or battery in the head vehicle 10 is below a predetermined remaining level based on the remaining amount information. When the controller 201 determines, via the communication unit 202, that the fuel or battery in the head vehicle 10 is below a predetermined remaining level, it outputs the notification information to the in-vehicle device 100 of the head vehicle 10. The predetermined remaining level is set as the amount of remaining fuel suitable for refueling the vehicle 10 or recharging the battery.

In this variation, the process of S201 of the second flowchart indicated in FIG. 7 is replaced by the process of sending the second request information to the in-vehicle device 100 of the head vehicle 10 and determining whether the fuel or battery of the head vehicle 10 is below the predetermined remaining level. If the fuel or battery in the head vehicle 10 is not below the predetermined remaining level, the process is terminated because there is no need to refill the fuel or charge the battery in the head vehicle 10. If the fuel or battery in the head vehicle 10 is below the predetermined remaining level, the notification information is output to the in-vehicle device 100 of the head vehicle 10. In this way, traffic congestion can still be controlled.

OTHER EMBODIMENTS

The embodiments described above are examples only, and the present disclosure may be modified and implemented as appropriate without departing from the gist thereof. The processes and components described in present disclosure may be freely combined as long as no technical contradictions arise.

The process described as being performed by one device may be shared and executed by multiple devices. Alternatively, the processes described as being performed by different devices may be performed by one device. In a computer system, it is possible to flexibly change what hardware configuration (server configuration) is used to realize each function.

This disclosure can also be realized by supplying a computer program implementing the functions described in the above embodiments to a computer, and having one or more processors of said computer read and execute the program. Such computer programs may be provided to a computer by a non-transitory computer-readable storage medium that can be connected to the computer's system bus, or may be provided to a computer over a network. Non-transient computer readable storage media, for example, any type of disk, such as magnetic disks (such as floppy (registered trademark) disks or hard disk drives (HDDs)), optical disks (such as CD-ROM, DVD disks, or Blu-ray disks), Any type of media suitable for storing electronic instructions, such as read-only memory (ROM), random access memory (RAM), EPROM, EEPROM, magnetic cards, flash memory, or optical cards.

What is claimed is:

1. An information processing apparatus comprising:
a database that includes road information; and
a server comprising at least one processor configured to:
acquire the road information and identify a road segment on which a first vehicle is currently traveling;
first determine whether speed of the first vehicle traveling at a head of a convoy of more than a predetermined length is less than a predetermined speed;
control operation of the first vehicle, including running of the first vehicle;
second determine whether a lane in which the first vehicle is traveling has a plurality of lanes based on the road information;
suggest to the first vehicle to move from a first lane to a second lane, the first lane including an overtaking lane and the second lane including a driving lane;
output notification information to induce a user of the first vehicle to stop traveling at the head of the convoy, when the speed of the first vehicle is less than the predetermined speed; and
repeatedly execute the first determining, the second determining, and the outputting in a predetermined cycle.

2. The information processing apparatus according to claim 1, wherein the processor outputs the notification information proposing to the user of the first vehicle to visit a specified facility when the specified facility exists within a predetermined range from a current position of the first vehicle that can be proposed to be visited to the user of the first vehicle.

3. The information processing apparatus according to claim 2, wherein the processor determines content of the notification information according to presence or absence of traffic congestion on a scheduled traveled route of the first vehicle.

4. The information processing apparatus according to claim 1, wherein the processor outputs the notification information to urge the user of the first vehicle to change the lane in which the first vehicle is traveling, when the processor determines that it is possible to change the lane in which the first vehicle is traveling based on information about the lane in a road segment in which the first vehicle is traveling.

5. The information processing apparatus according to claim 1, wherein the processor outputs the notification information that suggests refilling fuel of the first vehicle or charging battery of the first vehicle to the user of the first vehicle when it is determined that fuel or battery of the first vehicle is less than a predetermined remaining amount based on information of remaining amount of the fuel or battery of the first vehicle.

6. The information processing apparatus according to claim 1, wherein the processor is configured to obtain the predetermined length based on the convoy formed by the plurality of the predetermined number of vehicles traveling in a same lane on a single road segment or a connected plurality of road segments.

7. The information processing apparatus according to claim 1, wherein the processor is configured to output the notification information, via audio or display, to an in-vehicle device mounted on the vehicle.

* * * * *